United States Patent Office 3,136,812
Patented June 9, 1964

3,136,812
BORON-CARBORANE BONDED COMPOUNDS
James L. Boone and Robert J. Brotherton, Fullerton, and Lowell L. Petterson, Whittier, Calif., assignors to United States Borax & Chemical Corporation, Los Angeles, Calif., a corporation of Nevada
No Drawing. Filed Sept. 21, 1961, Ser. No. 140,646
4 Claims. (Cl. 260—551)

The present invention relates as indicated to boron-carborane bonded compounds and has more particular reference to a new group of compounds, the B-tricarboranylborazoles, and to a method for preparing the same.

The B-tricarboranylborazoles of the present invention are thermally stable derivatives of carborane ($B_{10}H_{12}C_2$). Due to their high boron and low carbon content they are high-energy compounds and will be found to be particularly useful as components of high-energy propellants. Additionally they have important uses as precursors for the preparation of high-energy polymeric materials having high boron and low carbon contents, which polymeric materials will be found useful in high-energy solid propellant systems.

It is, therefore, the principal object of this invention to provide as new compositions of matter the B-tricarboranylborazoles.

It is a further object of the present invention to provide a method for preparing the B-tricarboranylborazoles.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises as new compositions of matter the B-tricarboranylborazoles having the formula

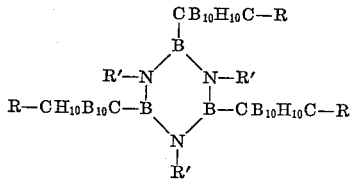

where R is a radical selected from the group consisting of alkyls of from 1 to 6 carbon atoms and phenyl, and R' is selected from the group consisting of hydrogen, alkyls of from 1 to 6 carbon atoms and phenyl.

The preparation of the B-tricarboranylborazoles of the present invention can best be illustrated by the following equation:

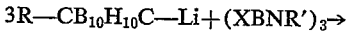
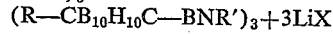

where R—$CB_{10}H_{10}C$—Li is a monolithiocarboranyl compound, $(XBNR')_3$ is a B-trihaloborazole, X is either chlorine or bromine, R is either an alkyl of from 1 to 6 carbon atoms or phenyl, and R' is either hydrogen, an alkyl of from 1 to 6 carbon atoms or phenyl.

The preferred method for performing the above reaction is to add the monolithiocarboranyl compound to the B-trihaloborazole with constant agitation at a temperature of less than about 20° C., under an inert atmosphere. The resultant reaction mass is allowed to warm to about ambient temperature with continued agitation, and the solid precipitate which is formed is removed by filtration. Removal of the volatile materials from the residual solution by distillation, at reduced pressure, then yields the desired B-tricarboranylborazole.

The monolithiocarboranyl compounds applicable as reactants in the present process, and means for their preparation are known in the art. The following list is illustrative of the monolithiocarboranyl compounds applicable to the present invention:

11-lithio-12-methyl carborane
11-lithio-12-ethyl carborane
11-lithio-12-n-propyl carborane
11-lithio-12-isopropyl carborane
11-lithio-12-n-butyl carborane
11-lithio-12-sec-amyl carborane
11-lithio-12-phenyl carborane The borazoles applicable as reactants in the present process are heterocyclic hexatomic ring compounds having the formula $(XB-NR)_3$ where X, the substituent on the boron atoms of the ring, are either chlorine or bromine, and R the substituent on the nitrogen atoms of the ring are either hydrogen, or alkyl radicals of from 1 to 6 carbon atoms, or phenyl. In the preferred embodiment of the invention we use the B-trichloro substituted borazoles since they are the most readily available of the halogenated borazoles.

The following list is illustrative of the B-trihaloborazoles which are applicable to the present invention:

B-trichloroborazole
B-tribromoborazole
B-trichloro-N-trimethylborazole
B-tribromo-N-triethylborazole
B-trichloro-N-triisopropylborazole
B-tribromo-N-triisobutylborazole
B-tribromo-N-tri-n-hexylborazole
B-trichloro-N-triphenylborazole It is to be clearly understood that the foregoing lists are only a partial enumeration of the monolithiocarboranyl compounds and B-trihaloborazoles applicable to the present invention and are not intended to limit the invention.

So that the present invention can be more clearly understood, the following examples are given for illustrative purposes.

I

A solution of 4.95 grams (0.024 mole) of 11-lithio-12-n-butyl carborane in 50 ml. of diethyl ether and 20 ml. of n-heptane was slowly added with constant agitation to a solution of 1.80 grams (0.008 mole) of B-trichloro-N-trimethylborazole in 125 ml. of diethyl ether at 2° C., in a nitrogen atmosphere. Agitation was continued, and after about 2 hours the reaction mass was allowed to warm to about room temperature. The solid precipitate which had formed was removed from the reaction mass by filtration, and chemical analysis showed it to be lithium chloride. The volatile materials were removed from the filtrate by vacuum distillation at room temperature and a viscous liquid was recovered. This material was then redissolved in an etherpentane solution and the solids which formed were removed by filtration. Removal of the solvents by distillation from the filtrate yielded 3.69 grams (64.5% yield) of B-tri(n-butylcarboranyl)-N-trimethylborazole. Chemical analysis of the product yielded the following data:

Calculated for $C_{21}H_{66}B_{33}N_3$: B=49.74%; H=9.27%; N=5.85%; mol. wt.=718. Found in product: B=48.60%; H=9.21%; N=6.42%; mol. wt.=720.

II

The reaction was performed as described in Example I, except B-tribromo-N-trimethylborazole was used instead of B-trichloro-N-trimethylborazole, and toluene was substituted for the diethyl ether. The product recovered was the same as the product of Example I.

III

A solution of 10.19 grams (0.045 mole) of 11-lithio-12-phenyl carborane in 100 ml. of diethyl ether and 40 ml. of n-heptane was slowly added with constant agitation to a solution of 2.76 grams (0.015 mole) of B-trichloroborazole in 200 ml. of diethyl ether at 10° C., in a nitrogen atmosphere. Agitation was continued, and after about 2 hours the reaction mass was allowed to warm to about room temperature. The solid precipitate which had formed was removed from the reaction mass by filtration, and chemical analysis showed it to be lithium chloride. The volatile materials were removed from the filtrate by vacuum distillation at room temperature and a viscous liquid was recovered. This material was then redissolved in an ether-pentane solution and the solids which formed were removed by filtration. Removal of the solvents by distillation from the filtrate yielded 6.60 grams (59.8% yield) of B-tri(phenylcarboranyl)borazole. Chemical analysis of the product yielded the following data:

Calculated for $C_{24}H_{48}B_{33}N_3$: B=48.52%; H=6.58%; N=5.71%; mol. wt.=736. Found in product: B=47.76%; H=6.50%; N=6.37%; mol. wt.=719.

Other modes of applying the principle of the invention may be employed, change being made as regards the details described, provided the features stated in any of the following claims or the equivalent of such be employed.

We, therefore, particularly point out and distinctly claim as our invention:

1. The B-tricarboranylborazoles having the formula

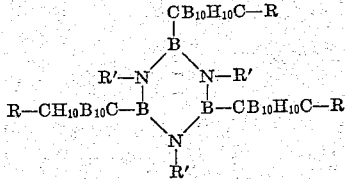

where R is a radical selected from the group consisting of alkyls of from 1 to 6 carbon atoms and phenyl, and R' is selected from the group consisting of hydrogen, alkyls of from 1 to 6 carbon atoms and phenyl.

2. B-tri(n-butylcarboranyl)-N-trimethylborazole.
3. B-tri(phenylcarboranyl)borazole.
4. The method for preparing B-tricarboranylborazoles having the formula

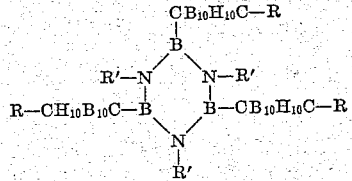

which comprises adding a monolithiocarboranyl compound having the formula R—$CB_{10}H_{10}$C—Li to a B-trihaloborazole having the formula $(XBNR')_3$ with constant agitation, at a temperature less than about 20° C., in an inert atmosphere, allowing the resultant reaction mass to warm to about ambient temperature, removing the solid precipitate formed from said reaction mass, and recovering the desired B-tricarboranylborazole from the resultant solution where R is a radical selected from the group consisting of alkyls of from 1 to 6 carbon atoms and phenyl, R' is selected from the group consisting of hydrogen, alkyls of from 1 to 6 carbon atoms and phenyl, and X is a halogen selected from the group consisting of chlorine and bromine.

No references cited.